Figure 1:
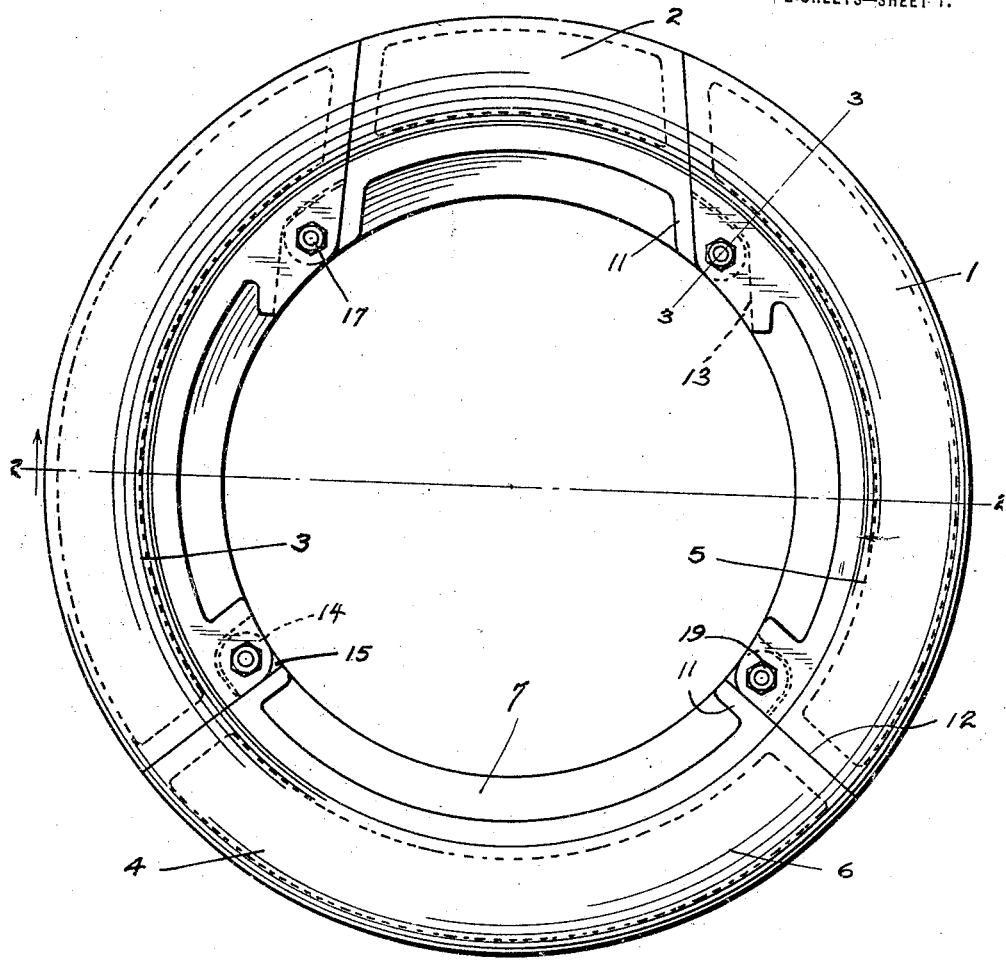

F. A. WATSON.
COLLAPSIBLE TIRE CORE.
APPLICATION FILED AUG. 25, 1920.

1,382,035.

Patented June 21, 1921.
2 SHEETS—SHEET 1.

Inventor
Frank A. Watson
By C. C. Shepherd
Attorney

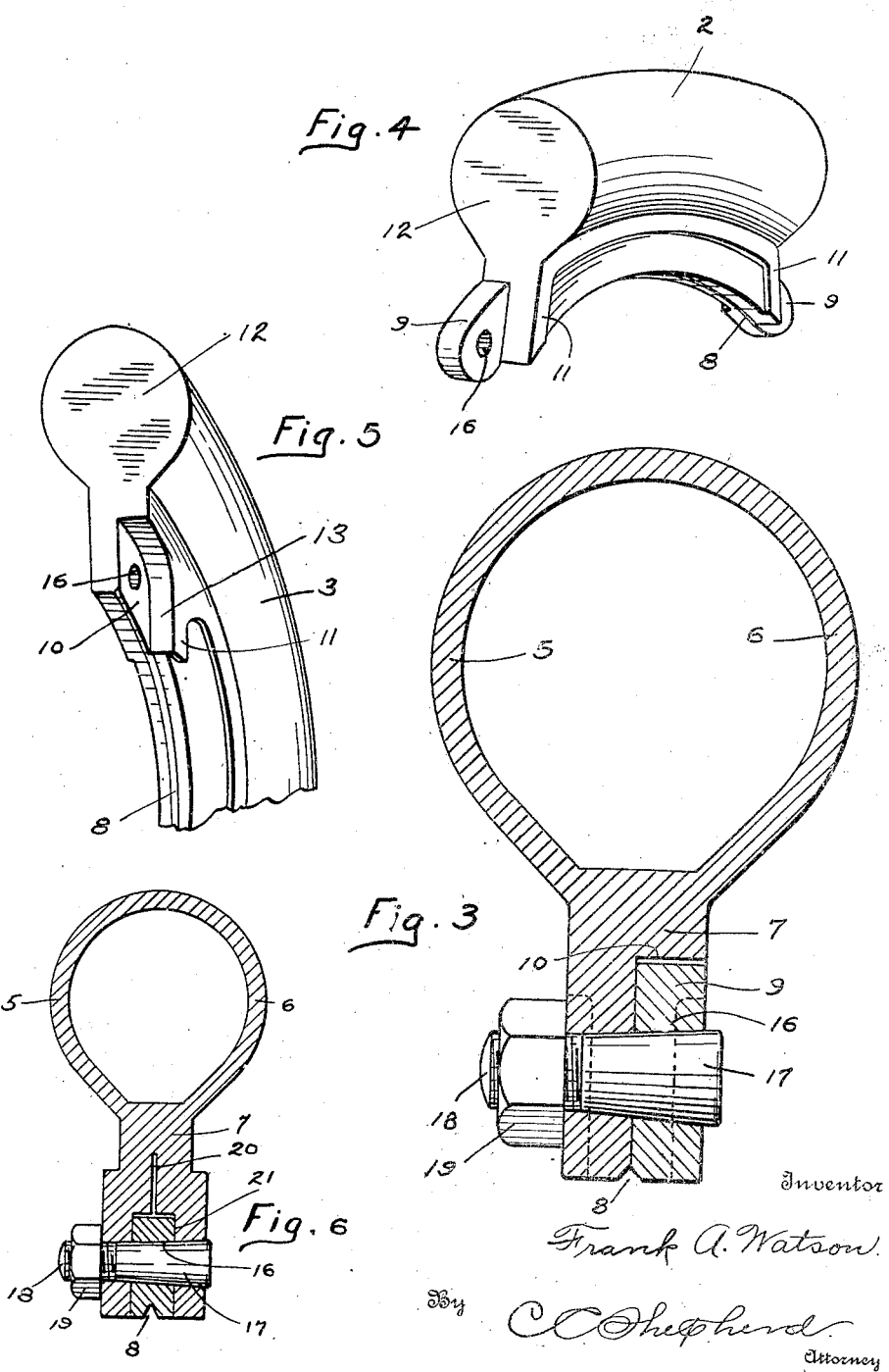

UNITED STATES PATENT OFFICE.

FRANK A. WATSON, OF SPRINGFIELD, OHIO.

COLLAPSIBLE TIRE-CORE.

1,382,035.  Specification of Letters Patent.  Patented June 21, 1921.

Application filed August 25, 1920. Serial No. 406,018.

*To all whom it may concern:*

Be it known that FRANK A. WATSON, a citizen of the United States, residing at Springfield, in the county of Clark and State of Ohio, has invented certain new and useful Improvements in Collapsible Tire-Cores, of which the following is a specification.

This invention relates to improvements in tire cores or mandrels of the type employed in the manufacture and production of pneumatic tire casings, and has particular reference to a core of this character and purpose wherein a plurality of separable sections are provided which, when assembled serve to constitute an annulus around which a tire casing may be built, and whereby upon the collapsing or separation of the sections the core may be readily removed in a convenient manner from the casing completed thereabout.

The primary object of the invention resides in a tire core composed of separable sections wherein a joint structure of novel and improved construction is provided between the abutting or meeting ends of the sections, which joint structure is of such design as to act or serve positively for securely connecting and holding the sections together in true circumferential form, to preserve said form after the core has been subjected to more or less wear and usage, and to be of simple yet efficient construction so that the sections may be connected or disconnected in a simple expeditious and time saving manner.

Another object of the invention resides in a tire core of the above character wherein the collapsible sections have their abutting ends provided with longitudinally projecting apertured ears, which are arranged to lie adjacent to apertures provided in the ends of the flanges of adjacent sections, the apertures of said ears and flanges being arranged to receive tapered bolt elements, which carry threaded binding members, whereby upon the tightening of said members the bolt elements will be drawn securely into said apertures to firmly and substantially connect and complete effective joints between the ends of the sections, which joints serve to circumferentially contract the sections into true annular relation, to eliminate looseness or play between sections, and to compensate for the effects of wear.

A further object resides in positioning the tapered bolt elements in such manner in the overlapping joint ends that the application and removal of the elements to and from the sections may be quickly and easily effected, so that but a minimum of time and labor will be consumed in assembling or collapsing the core.

With these and other objects in view, as will appear as the description proceeds, the invention accordingly consists in the novel features of construction, combinations of elements and arrangements of parts, hereinafter to be fully described and pointed out in the appended claims.

Figure 2:
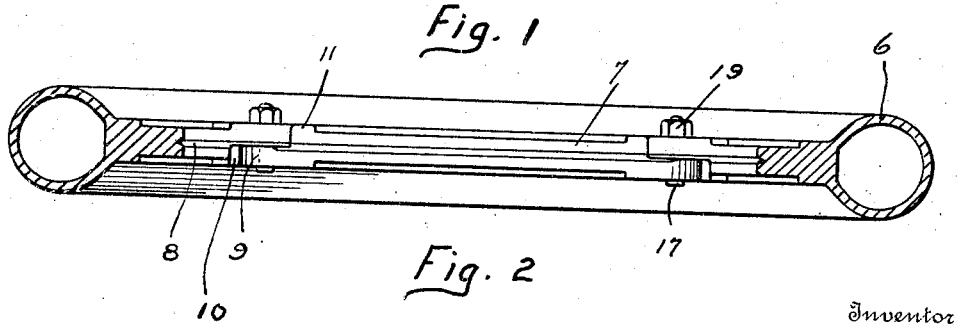

In the accompanying drawings, forming a part of this specification, and in which similar characters of reference denote like and corresponding parts:

Figure 1 is a side elevation of the tire core comprising the preferred form of the invention, Fig. 2 is a transverse sectional view taken through the core on the plane disclosed by the line 2—2 of Fig. 1, Fig. 3 is a vertical transverse sectional view taken through the core on the line 3—3 of Fig. 1, Fig. 4 is a detail perspective view of the key section, Fig. 5 is a fragmentary detail sectional view of the socket end of one of the body sections, and Fig. 6 is a transverse sectional view taken through a slightly modified form of the core.

In the particular embodiment of the invention shown in the drawings, the core 1 is formed from four separable sections, the key section being indicated by the numeral 2, while the remaining body sections are designated by the numerals 3, 4 and 5; these sections are preferably formed from a suitable relatively light weight metal, in order that the total weight of the core will be reduced to the greatest possible practicable extent, and to this end each section is formed to provide a substantially hollow transversely circular body 6 upon which a tire casing may be built, and said body portion of each section terminating inwardly in a parallel sided arcuate flange 7, which is angularly formed with the body 6. It will be observed that the joints between the sections 3, 4 and 5 are located in radial planes, and joints between the key section 2 and the body sections 3 and 5 are disposed in inwardly diverging planes. When the four sections are assembled, a complete annulus is provided, which may be readily collapsed by drawing inwardly the key section 2. It will be observed, also, that when the sections are assembled the flanges 7 will constitute a complete ring, the inner edge of which is provided with a groove 8, in which may be seated the ends of an expanding central spire which may be employed for supporting the core. The construction so far described is of the usual form found in collapsible cores for building tire casings.

It is the primary object of the invention to provide a simple and efficient joint structure between the sections, and to this end the flange 7 of the key section 2 is provided at its ends with a pair of circumferentially projecting apertured ears 9 which are arranged to be seated within recesses or sockets 10 provided in the adjacent ends of the flanges 7 of the body sections 3 and 5. It will be observed that the flange 7 of the key section is enlarged transversely as at 11 contiguous to its ends, and that the flanges of the body sections are similarly enlarged at their ends, in order that the meeting faces 12 of said sections will be of relatively large area so as to permit the same to be closely and firmly brought together when the sections are finally assembled. In other words, the enlargements 11 provide broad bearing surfaces between the flange ends of the sections without materially increasing the weight of the core, a feature which provides a strong light weight construction. By enlarging the ends of the sections as described, the sockets or recesses 10 may be readily provided and may be of such depth as to serve effectively in receiving the tongues or ears 9. The sockets in the sections 3 and 5 which receive the ears 9 are provided with open lower ends, whose side walls 13 extend substantially parallel with the walls or faces 12 between the key and body sections, and by this construction the tongues of the key section may be readily received within said socket, when the key section is moved outwardly to assume its operative position within the core.

The section 4 is also provided at its ends with the circumferentially projecting ears 14, which are received within sockets 15 formed adjacent ends of the sections 3 and 5. These sockets 15 are also provided with open inner portions and sides which permit the ears 14 of the section 4 to be readily assembled.

The ears 9 and 14 and the walls of the sockets 10 and 15 are provided with registering tapering openings or apertures 16, which are adapted to receive a plurality of tapering bolt elements 17, which elements are provided with threaded shanks 18 capable of receiving a plurality of threaded binding members or nuts 19. The elements 17 are adapted to be situated within the openings 16 and the larger ends of said elements are of a diameter greater than that of the smaller ends of the openings 16, a feature which enables the binding members 19 to be threaded upon the shanks 18 so that they will frictionally engage with the outer surface of the flanges 7, whereby upon the tightening of the binding members said bolts will be drawn longitudinally into the openings 16 until the same securely engage in a wedge like manner with the walls of said openings, whereby the bolt elements will then serve to securely bind the tongues or ears 9 and 14 in clamped engagement with the walls of said sockets, thus providing a firm and positive connection between the section ends.

The foregoing description taken in connection with the accompanying drawings, it will be manifest that the present invention provides a simple yet effective structure for connecting the ends of tire sections in assembled relationship. By the use of the tapering bolt elements and the similarly formed openings 16 a wedging action is set up when the bind members 19 are tightened, which action serves to contract the sections circumferentially so that the joint faces 12 will be firmly and positively forced together. Also, by the use of the tapered bolt elements wear in the openings 16 is readily taken up, so that the true annular relation necessary between the sections is maintained even after the core has been subjected to more or less continuous use. This feature does not obtain when ordinary bolts are employed, since the shanks of the latter are of uniform diameter, and hence when the walls of the openings 16 begin to wear looseness will exist between the section joints. In collapsing the core, the binding members 19 are moved outwardly a limited distance upon the shanks 18, then by the use of a concussion tool, blows may be delivered to the threaded ends of the bolt elements so that the latter may be loosened from their clamping engagement with the walls of the openings 16. After the elements have been so loosened, the nuts 19 may be removed altogether, and similarly the bolt elements may be withdrawn from the openings 16, thus permitting the key section 2 to be drawn inwardly, following which the body sections may be suitably collapsed.

While the foregoing description specifically sets forth what is now believed to be the best mode of applying the principles of the invention, yet it should be understood that said description does not necessarily measure the invention, except as the latter is defined by the following claims. For instance, as shown in Fig. 6, the core sections may have their ends split as at 20, to receive the fastening tongues. By so splitting the ends of the core sections a certain resiliency will be given thereto, which will tend to spread the jaws when the fastening bolts are removed, thereby enabling the tongues to be readily removed without sticking from their positions within the sockets 21. Obviously, such alterations as these may be made in the construction of my improved core without departing from the intent or ambit of the invention.

What is claimed is:

1. In a collapsible tire core, a key section having ears protruding from the opposite ends thereof, separable body sections coöperative with said key section, said body sections having certain of the ends thereof provided with sockets arranged to receive said ears, and a plurality of nut carrying threaded and tapering bolt elements arranged to pass through openings provided in said ears and the walls of said sockets, whereby upon the tightening of the nuts of said elements said section ends will be securely united.

2. In a collapsible tire core, a plurality of separable sections, each of said sections being formed to include a substantially circular body portion and an inwardly located flange, a joint between said section ends, said joint comprising an ear formed upon one of said sections and arranged to project adjacent to the flange of the adjoining section, said ear being provided with an opening arranged to register with an opening formed in said flange, and a nut carrying longitudinally tapered bolt element arranged to pass through said openings.

3. In a collapsible tire core, a plurality of separable sections, means for connecting the ends of said sections comprising for each section a circumferentially projecting ear, said ears being arranged to be received within sockets formed in the ends of adjoining sections, said sockets being provided with substantially resilient side walls, and a bolt structure arranged to pass through registering openings provided in said ears and side walls to maintain said sections in assembled order.

4. In a collapsible tire core, a plurality of separable sections, each of said sections being formed to include a substantially circular body portion and an integral inwardly extending flange, means for connecting the adjoining ends of said sections, comprising an ear arranged to project circumferentially from the end of one of said sections, said ear being arranged to be received within a socket formed in the end of the flange of the adjoining section, and a removable bolt structure arranged to pass through said ear and flange for retaining the ear within its seated position within said socket.

5. In a collapsible tire core, a plurality of separable sections, ears projecting from the ends of said sections and arranged to be received within sockets formed in adjoining sections, and a plurality of threaded longitudinally tapering bolt elements arranged to pass through said ears to connect the latter with adjoining sections.

6. In a collapsible tire core, a key section and a plurality of separable body sections, sockets provided in said body sections contiguous to said key section, integral ears projecting from said key sections and arranged to be received within said sockets, and fastening elements arranged to pass through registering openings provided in said ears and the walls of said sockets.

7. In a collapsible tire core, a key section and a plurality of separable body sections, each of said sections being formed to include a substantially circular body portion and an inwardly projecting flange, sockets formed in the flanges of said body sections contiguous to said key sections, integral ears projecting from the ends of the flange of said key section and arranged to be positioned within said sockets, and fastening elements disposed to pass transversely through registering openings formed in said ears and the walls of said sockets.

8. In a collapsible tire core, a key section, a plurality of separable body sections, each of said sections being formed to include a substantially circular body portion and an inwardly projecting arcuate flange, said body sections having the ends of their flanges provided contiguous to said key section with a plurality of sockets, ears projecting from the ends of the flange of said key section and arranged to be seated within said sockets, the walls of said sockets and said ears being provided with registering tapering openings, and tapering elements arranged to be received within said openings to hold said sections in assembled relation.

9. In a collapsible tire core, a key section, a plurality of separable body sections, each of said sections being formed to include a circular body portion and an inwardly arranged flange, ears formed upon the ends of the flange of said key section and arranged to project circumferentially into engagement with the flanges of adjacent body sections, said ears and flanges being provided with tapering openings, and tapering securing elements arranged to be positioned within said openings to hold the sections in assembled relation.

In testimony whereof I affix my signature.

FRANK A. WATSON.